United States Patent
Morrison et al.

(10) Patent No.: US 10,821,938 B1
(45) Date of Patent: Nov. 3, 2020

(54) COMPUTE SYSTEM WITH THEFT ALERT MECHANISM AND METHOD OF OPERATION THEREOF

(71) Applicant: MOJ.IO, Inc., Vancouver (CA)

(72) Inventors: Andrew Morrison, Kirkland, WA (US); Kyle MacDonald, Sunnyvale, CA (US); Alan Messer, Los Gatos, CA (US)

(73) Assignee: MOJ.IO, Inc., Vancouver (CA)

( * ) Notice: Subject to any disclaimer, the term of this patent is extended or adjusted under 35 U.S.C. 154(b) by 0 days.

(21) Appl. No.: 16/864,501

(22) Filed: May 1, 2020

(51) Int. Cl.
| | |
|---|---|
| G05D 1/02 | (2020.01) |
| B60R 25/30 | (2013.01) |
| B60R 25/102 | (2013.01) |
| B60R 25/10 | (2013.01) |

(52) U.S. Cl.
CPC ............ B60R 25/30 (2013.01); B60R 25/102 (2013.01); *B60R 2025/1016* (2013.01)

(58) Field of Classification Search
CPC ..... B60R 25/104; B60R 25/30; B60R 25/102; B60R 2025/1016
See application file for complete search history.

(56) References Cited

U.S. PATENT DOCUMENTS

| | | | |
|---|---|---|---|
| 8,549,318 B2 | 10/2013 | White et al. | |
| 8,571,743 B1* | 10/2013 | Cullinane | G05D 1/00 |
| | | | 701/23 |
| 9,783,159 B1 | 10/2017 | Potter et al. | |
| 9,872,225 B2 | 1/2018 | Guba et al. | |
| 2005/0128105 A1* | 6/2005 | Green | H01L 31/048 |
| | | | 340/944 |
| 2007/0239992 A1 | 10/2007 | White et al. | |
| 2017/0078948 A1 | 3/2017 | Guba et al. | |
| 2019/0035262 A1* | 1/2019 | Brady | G08G 1/005 |
| 2019/0197883 A1* | 6/2019 | Camras | B60Q 1/525 |

FOREIGN PATENT DOCUMENTS

DE        10119959 A1    10/2002

* cited by examiner

*Primary Examiner* — Munear T Akki
(74) *Attorney, Agent, or Firm* — Perspectives Law Group, Corp.

(57) ABSTRACT

A method of operation of a compute system includes: receiving a vehicle-related sensor reading in a real-time; determining in the real-time a theft level indicator for a vehicle based on the vehicle-related sensor reading; generating a theft alert based on the theft level indicator being a priority event; analyzing the vehicle-related sensor reading with a theft risk model to generate the theft alert when the theft level indicator is a non-priority event; and communicating the theft alert for displaying on a device.

14 Claims, 7 Drawing Sheets

COMPUTE SYSTEM WITH THEFT ALERT MECHANISM AND METHOD OF OPERATION THEREOF

TECHNICAL FIELD

An embodiment of the present invention relates generally to a compute system, and more particularly to a system with a theft alert mechanism for location.

BACKGROUND ART

Modern systems, especially compute systems are providing increasing levels of functionality to support modern life including additional status monitoring and connectivity services. Technology has enabled increased tracking of vehicle usage. Theft is often reported long after the vehicle has already been stolen.

Thus, a need still remains for a compute system with a theft alert mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a compute system including: receiving a vehicle-related sensor reading in a real-time; determining in the real-time a theft level indicator for a vehicle based on the vehicle-related sensor reading; generating a theft alert based on the theft level indicator being a priority event; analyzing the vehicle-related sensor reading with a theft risk model to generate the theft alert when the theft level indicator is a non-priority event; and communicating the theft alert for displaying on a device.

An embodiment of the present invention provides a compute system, including: a control circuit configured to: determine in a real-time a theft level indicator for a vehicle based on a vehicle-related sensor reading; generate a theft alert based on the theft level indicator being a priority event; analyze the vehicle-related sensor reading with a theft risk model to generate the theft alert when the theft level indicator is a non-priority event; and a communication circuit, coupled to the control circuit, configured to: receive the vehicle-related sensor reading in the real-time; and communicate the theft alert for displaying on a device.

An embodiment of the present invention provides a non-transitory computer readable medium including instructions for a compute system, including: receiving a vehicle-related sensor reading in a real-time; determining in the real-time a theft level indicator for a vehicle based on the vehicle-related sensor reading; generating a theft alert based on the theft level indicator being a priority event; analyzing the vehicle-related sensor reading with a theft risk model to generate the theft alert when the theft level indicator is a non-priority event; and communicating the theft alert for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
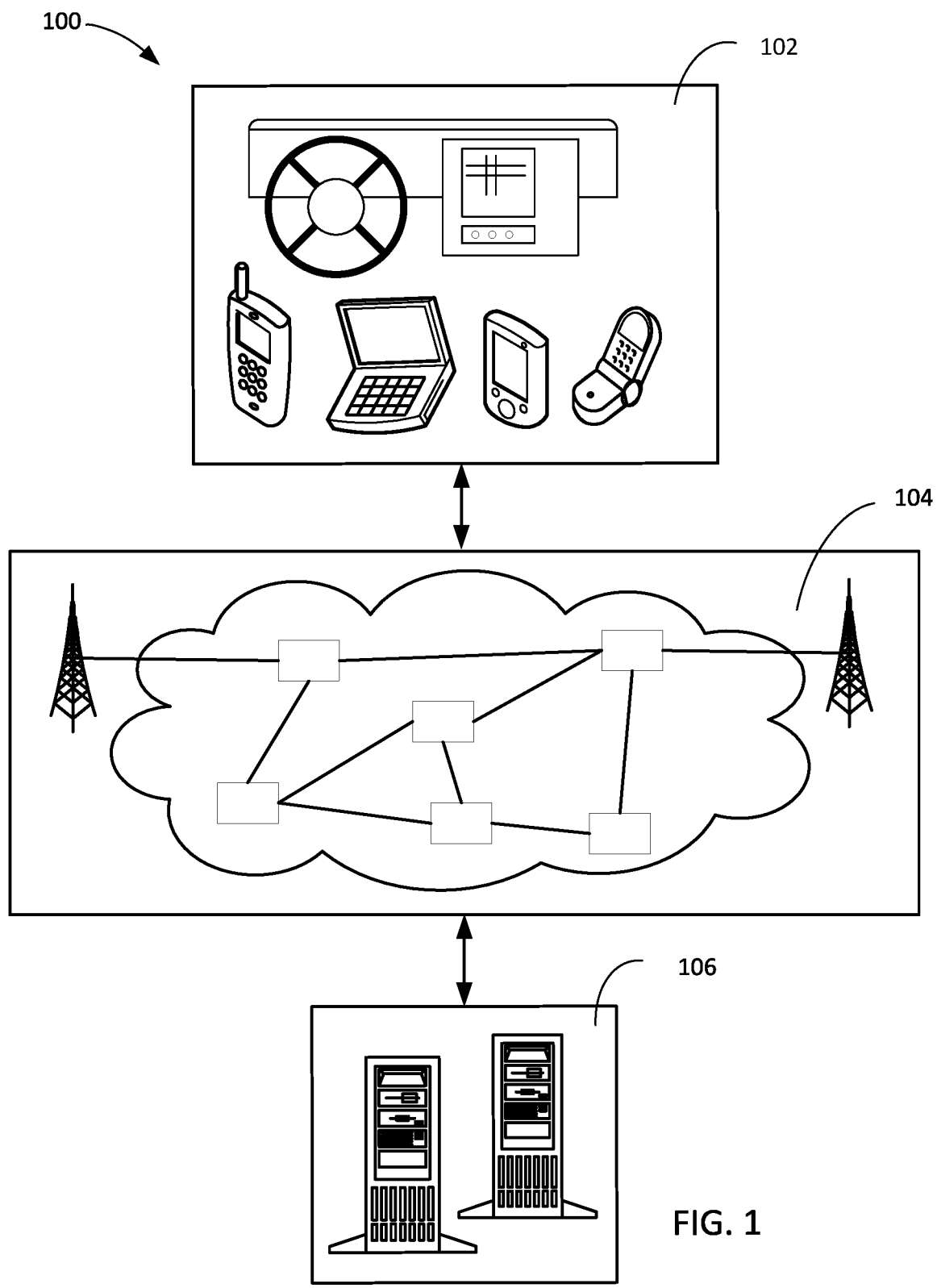
FIG. 1 is a compute system with an anonymization mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention can be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a compute system 100 with a theft alert mechanism in an embodiment of the present invention. The compute system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or a dongle or device that plugs into a vehicle. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, a vehicle, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the compute system 100 is described with the second device 106 as a computing device, although it is understood that the second device 106 can be different types of devices, such as a standalone sensor or measurement device. Also for illustrative purposes, the compute system 100 is shown with the second device 106 and the first device 102 as end points of the communication path 104, although it is understood that the compute system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
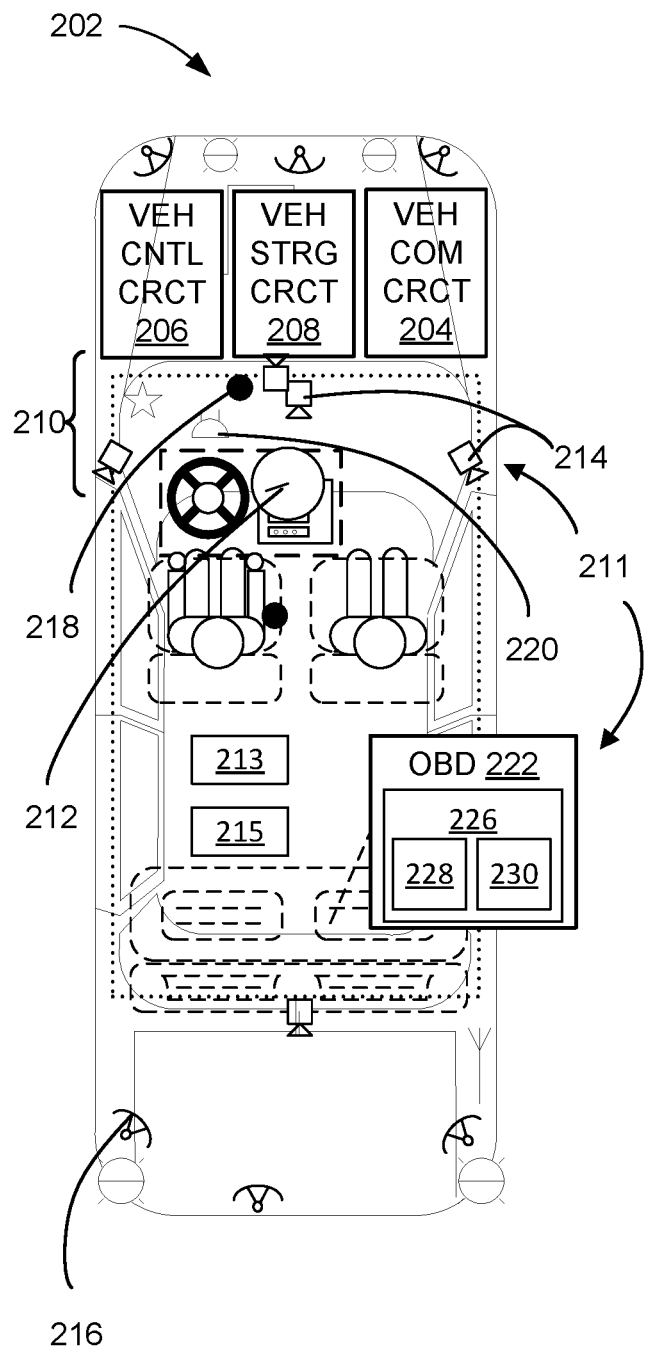
FIG. 2 is an example a top plan view of a vehicle of the compute system.

Referring now to FIG. 2, therein is shown an example a top plan view of various a vehicle 202 of the compute system 100 of FIG. 1. As an example, the compute system 100 can include or interact with the vehicle 202 as the first device 102 of FIG. 1. The vehicle 202 can also include one or more of vehicle sensors 210. The vehicle 202 is an object or a machine used for transporting people or goods. The vehicle 202 can also be capable of providing assistance in maneuvering or operating the object or the machine.

The vehicle 202 can represent a transportation mechanism of different or similar types. For example, the vehicle 202 can be only one instance or only one type of the transportation mechanism, such as an automobile. Also for example, the vehicle 202 can represent more than one vehicle, such as in a fleet or rental car scenario or the number of automobiles on the road or at a location. Further for example, the vehicle 202 can represent different types of the transportation mechanism, such as automobiles, trucks, motorcycles, bicycles, or seqways.

The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof. The vehicle control circuit 206 can respond to requests for the on-board diagnostics 222. The request can be from other parts of the vehicle 202, the compute system 100, or a combination thereof or external to the compute system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the compute system 100, or a combination thereof or external to the compute system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The vehicle sensors 210 are each a device for detecting or identifying environment of the vehicle 202. The vehicle sensors 210 can detect, identify, determine, or a combination thereof for the vehicle 202 itself, such as for status or movement thereof through a vehicle-related sensor reading 211. The vehicle-related sensor reading 211 can provide information about what is detected, identified, determined, or a combination thereof for environment within a cabin of the vehicle 202, an environment external to and surrounding the vehicle 202, or a combination thereof.

For example, the vehicle sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the vehicle sensors 210 other than or in addition to the location-movement sensor 212 such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the vehicle sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102.

As a more specific example, the vehicle communication circuit 204, the vehicle control circuit 206, the vehicle storage circuit 208, the vehicle sensors 210, one or more interfaces, or a combination thereof can be included in or make up the first device 102 included in or integral with the vehicle 202. Also as a more specific example, the vehicle 202 can include or be integral with the first device 102 including an embedded compute system, an infotainment system, a smart driving or a driver assistance system, a self-driving or a maneuvering system for the vehicle, or a combination thereof.

Figure 3:
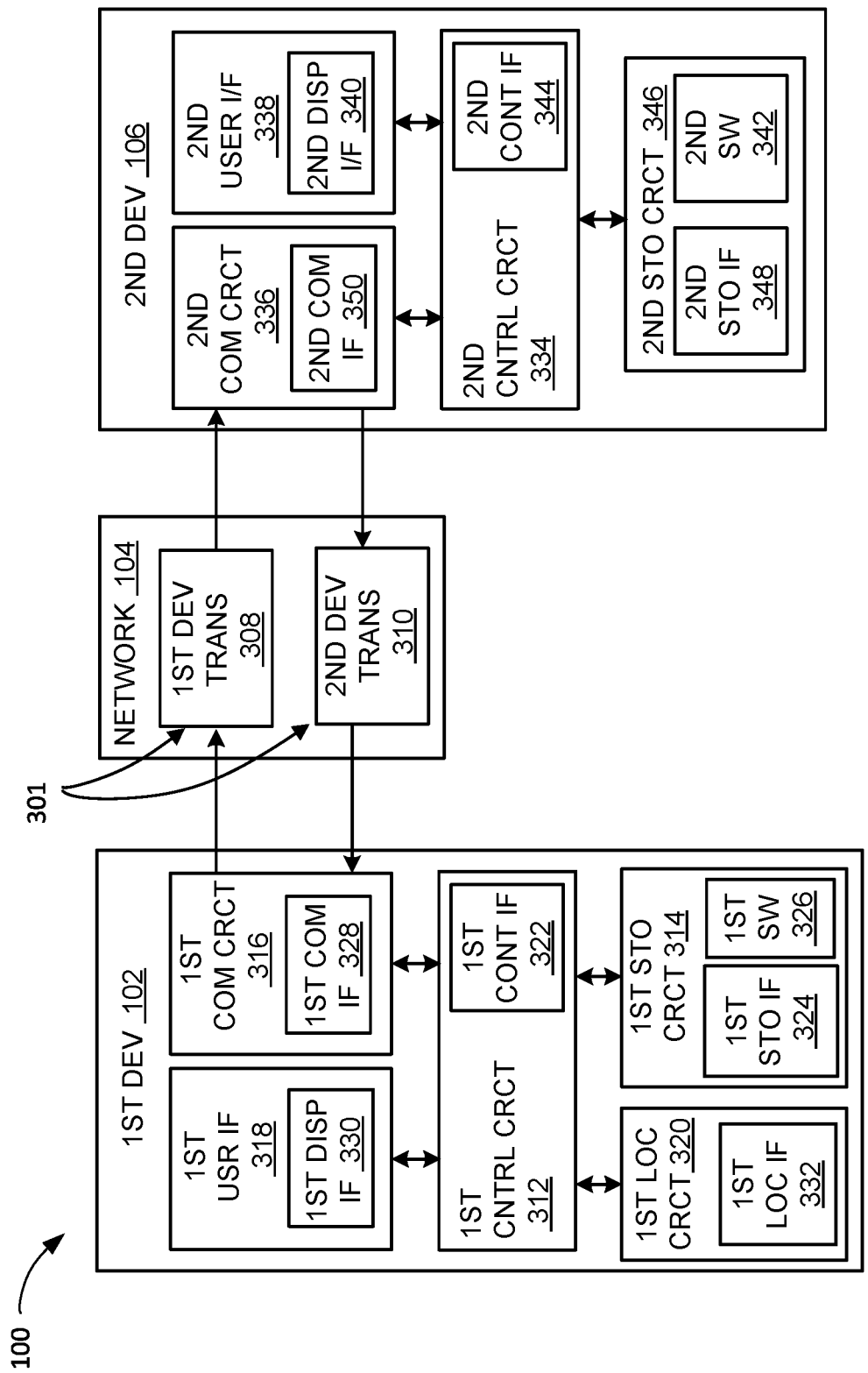
FIG. 3 is an exemplary block diagram of the compute system.

Referring now to FIG. 3, therein is shown an example of a block diagram of the compute system 100. The compute system 100 can include the first device 102, the communication path 104, and the second device 106. The first device 102, the second device 106, or a combination thereof can provide a nonvehicle reading 301. The nonvehicle reading 301 provides information from and to various circuits shown as an example in FIG. 3 and not embedded in the vehicle 202 of FIG. 2. The first device 102 can send information in a first device transmission 308 over the communication path 104 to the second device 106. The second device 106 can send information in a second device transmission 310 over the communication path 104 to the first device 102. The nonvehicle reading 301 can be sent with the first device transmission 308, the second device transmission 310, or a combination thereof.

For illustrative purposes, the compute system 100 is shown with the first device 102 as a client device, although it is understood that the compute system 100 can include the first device 102 as a different type of device. For example, the first device 102 can be a server including a display interface. Also for example, the first device 102 can represent the vehicle 202 of FIG. 2.

Also for illustrative purposes, the compute system 100 is shown with the second device 106 as a server, although it is understood that the compute system 100 can include the second device 106 as a different type of device. For example, the second device 106 can be a client device. Also for example, the second device 106 can represent the vehicle 202.

Further, for illustrative purposes, the compute system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 o to provide the intelligence of the compute system 100.

The circuits in the first device 102 can be the circuits discussed in the vehicle 202. For example, the first control circuit 312 can represent the vehicle control circuit 206 of FIG. 2 or vice versa. Also for example, the first storage circuit 314 can represent the vehicle storage circuit 208 of FIG. 2 or vice versa. Further, for example, the first communication circuit 316 can represent the vehicle communication circuit 204 of FIG. 2 or vice versa.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the compute system 100. The first control circuit 312 can also execute the first software 326 for the other functions of the compute system 100, including receiving location information from the first location circuit 320. The first location circuit 320 can also be or function as the location-movement sensor 212 of FIG. 2. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial compute system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the compute system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the compute system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

The second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the compute system 100 is shown with the second storage circuit 346 as a single hierarchy storage system, although it is understood that the compute system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The compute system 100 can be executed by the first control circuit 312, the second control circuit 334, or a combination thereof. For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

Figure 4:
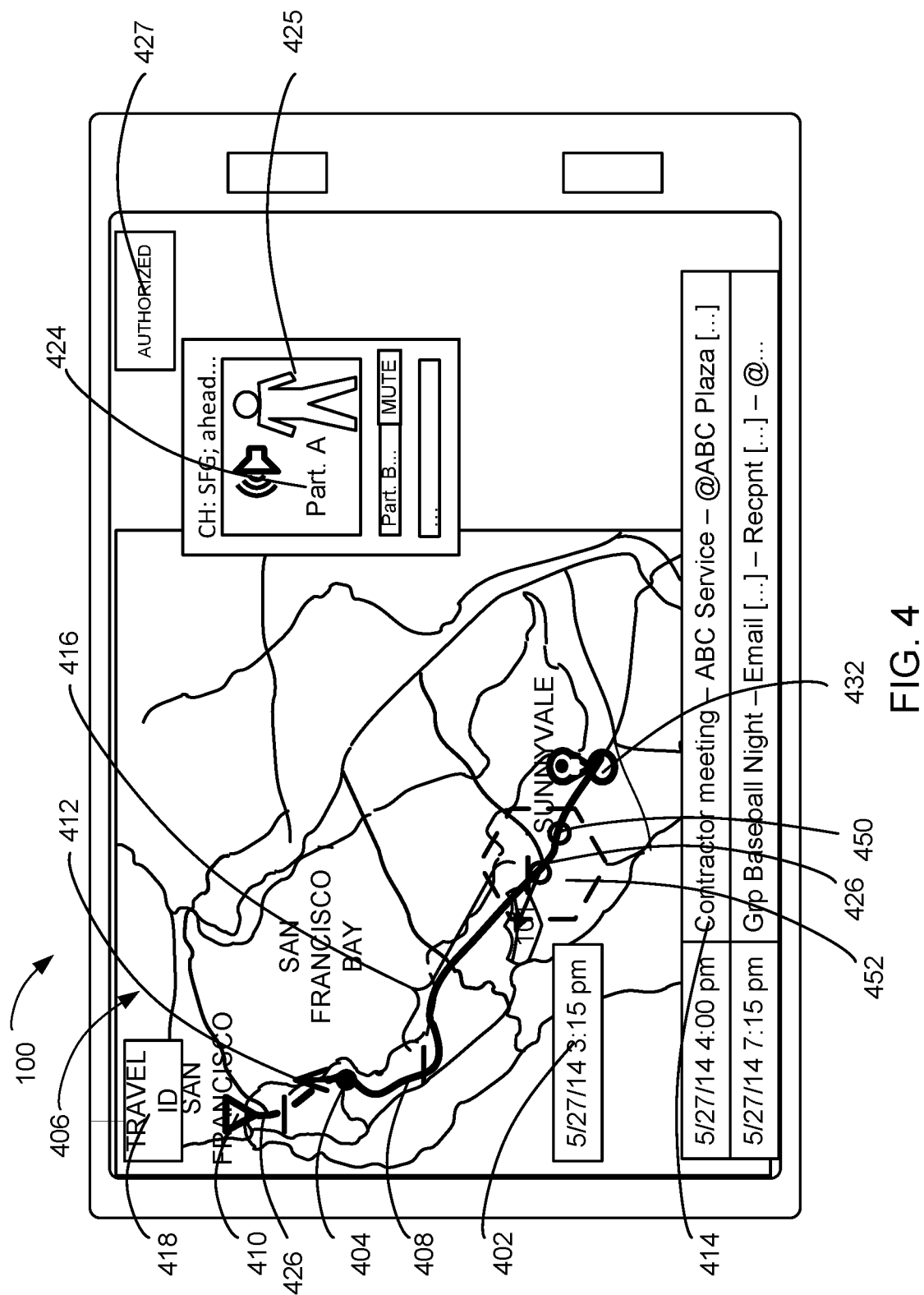
FIG. 4 is a display example of with a travel route.

Referring now to FIG. 4, therein is shown a display example of a travel route 408. In this example, the display example shown in FIG. 4 can represent a display on a fleet manager screen or security monitoring screen of the compute system 100 of FIG. 1. As a specific example, FIG. 4 can be rendered on the first display interface 330 of FIG. 3 or on the second display interface 340 of FIG. 3 where the fleet management function or security monitoring function is running on the first device 102 of FIG. 3, the second device 106 of FIG. 3, or a combination thereof. For brevity, clarity, and convenience, the example display will be described as being rendered on the first device 102 or the second device 106 while the vehicle 202 of FIG. 2 is traversing the travel route 408 or after traversing the travel route 408.

The compute system 100 can monitor the vehicle 202 and perform the security functions for the theft alert mechanism without require the driver, owner, or operator of the vehicle 202 to actively turn on the security function once the embodiment has been installed. The compute system 100 operates based on authorization or lack of authorization for the vehicle 202 being monitored.

The first device 102 can show a time clock 402, a current location 404, or a combination thereof. The time clock 402 provide a demarcation to denote a particular moment. As examples, the time clock 402 can be based on a system clock, a time zone, a server clock, a universal clock, a global clock, a global positioning clock, or a combination thereof. The current location 404 can represent a geographic location for the vehicle 202.

The compute system 100 of FIG. 1 can further include a navigation session 406 for the vehicle 202. The navigation session 406 is provides information associated to travel, services, point-of-interest, or a combination thereof. For example, the navigation session 406 can include an instance of invoking or utilizing the navigational guidance, map, travel-related features or functionalities of the compute system 100, or a combination thereof. The navigation session 406 can be utilized in autonomous driving mode, non-autonomous driving mode, or a combination thereof.

For the security function for the theft alert mechanism of the compute system 100, the navigation session 406 is not required to be entered. Continuing this example, the theft alert mechanism of the compute system 100 can utilize the navigation session 406 for an authorized use of the vehicle 202 to help distinguish between authorized and non-authorized use, which will be further described later. The compute system 100 can use the navigation session 406, portion of the navigation session 406, or a combination thereof for the theft alert mechanism.

The navigation session 406 can include the travel route 408, a travel destination 410, a travel direction 412, a travel purpose 414, a route segment 416, or a combination thereof. The travel route 408 can include a series of connected paths for traversing to the travel destination 410. The travel route 408 can include one or more travel paths joined by one or more nodes forming a path to the travel destination 410. The travel route 408 can include maneuvers corresponding to the nodes to follow or traverse the travel route 408.

The travel route 408 can also include a starting location 432, a waypoint 450, or a combination thereof in addition to the travel destination 410. The waypoint 450 can represent a stop of the navigation session 406 and a location different from and before reaching the travel destination 410. The waypoint 450 can also be considered the starting location 432.

For illustrative purposes, the travel route 408 is described as included as part of the navigation session 406, although the travel route 408 can be independent of the navigation session 406. For example, the navigation session 406 can represent an active guidance or commands for autonomous or non-autonomous driving with navigation instructions to traverse the travel route 408. Also for example, the travel route 408 can also be for a free-drive mode where there is no predefined instance of the travel destination 410, the waypoint 450, the travel direction 412, or a combination thereof. The travel route 408 can be recorded as the vehicle 202 traverses a travel path while in free-drive mode. The travel route 408 can trace the travel path and past readings of the current location 404. In free-drive mode, the compute system 100 can estimated potential instances of the starting location 432, the travel destination 410, the waypoint 450, the travel direction 412, or a combination thereof.

The travel route 408 can be from the current location 404, from the starting location 432 of the navigation session 406, from an arbitrary location as the starting location 432 such as the waypoint 450, or a combination thereof. The starting location 432 can be the initial location for the travel route 408. The travel route 408 can end at the travel destination 410 or include an instance of the travel destination 410 as a stop or an intermediate objective, such as the waypoint 450, within the travel route 408. The travel destination 410 can be an intended location or an objective of the traveling activity.

The travel direction 412 can be information regarding a bearing for a movement or an orientation of the vehicle 202. The travel direction 412 can include the bearing or the orientation relative to the travel route 408.

The travel purpose 414 can be a representation of a reason, a goal, an activity, an objective, or a combination thereof associated with the navigation session 406 or traversing the travel route 408. For example, the travel purpose 414 can include medical stops to pick up medical supplies, treatments, or organs for the travel destination 410 or the travel route 408. Also for example, the travel purpose 414 can include one or more scheduled events or activities at or within a predetermined distance from the travel destination 410.

The route segment 416 can be a unit or a grouping of paths within the travel route 408. The route segment 416 can include paths with common designations, such as a highway number or a street name. The route segment 416 can further be divisions or groupings based on distance or speed, exits or cross streets, number of occupants or travelers, geographical characteristic, such as for region or orientation of the path, path characteristic, such as number of lanes, or traffic regulation, or a combination thereof. The route segment 416 can be unique to each ingress or egress for each of the waypoint 450, the starting location 432, the travel destination 410, or a combination thereof.

In this example, FIG. 4 also depicts a participant identification 424. The participant identification 424 can include a name, a screen name, a contact information, such as phone number of email address, a vehicle information, or a combination thereof. The participant identification 424 can further include a temporary or an anonymous moniker. As a specific example, the participant identification 424 can represent either a person interacting with the compute system 100, a device operating with the compute system 100, the vehicle 202 operating with the compute system 100, or a combination thereof. Further to the specific example, the device or the vehicle operating with the compute system 100 can be associated with the person interacting with the compute system 100, such as a mobile phone or a vehicle assigned or owned by the person.

The participant identification 424 can represent an authorized user 425 for the vehicle 202. A vehicle owner can identify additional authorized users by sharing account credentials or adding multiple accounts associated with a fleet of vehicles.

The authorized user 425 represents a unique identification associated with an operator. The authorized user 425 can be provided an authorization 427 for the vehicle 202. The authorized user 425 can represent an individual or a group of individuals with account credentials to operate the vehicle 202.

The authorization 427 provides operational or interaction privileges for the authorized user 425 of the vehicle 202. The authorization 427 can be implemented in a number of ways. For example, the authorization 427 can include a code to enable operation or interaction with the vehicle 202. Also for example, the authorization 427 can be a physical device in addition to or separate from a non-physical device to enable operation or interaction with the vehicle 202. Further for example, the authorization 427 can be by association with the authorized user 425, such as the first device 102 as a cellular or smartphone. The authorization 427 can also include a number of items or combination of items such as those iterated as well as others.

Returning to the travel route 408 and for example, the compute system 100 can be identify or assign a trip identification 418 for the particular instance of the travel route 408. The trip identification 418 can represent a unique instance, invocation, or traversal of the travel route 408. The trip identification 418 can be different and unique for each and different traversal of the travel route 408.

As a specific example, each instance of the route segment 416 can be designated with a trip identification 418. The trip identification 452 can represent a label for the travel route 408 or a portion of the travel route 408, such as the route segment 416. The travel route 408 can be labeled with a number of different values or labels for the trip identification 452. In other words, the travel route 408 can be labeled with a number of different labels or values of the trip identification 452.

A recurrence 426 represents repeated traversal or stop within the travel route 408. The recurrence 426 can be a portion of the travel route 408, as shown as an example as a dashed portion of the travel route 408 in FIG. 4. The recurrence 426 can also apply repeated presence at or a repeated traversal for the starting location 432, the travel destination 410, the waypoint 450, the navigation session 406, the route segment 416, or a combination thereof. The recurrence 426 can be delineated or uniquely identified with the additional information with the participant identification 424. The recurrence 426 can be further unique per the trip identification 418.

Further, regarding the travel route 408, each traversal to the waypoint 450 can be considered a portion of the travel route 408, a portion of the navigation session 406, or a combination thereof. The waypoint 450 can represent an intermediate destination or the travel destination 410 if the navigation session 406 terminates at the waypoint 450.

Figure 5:
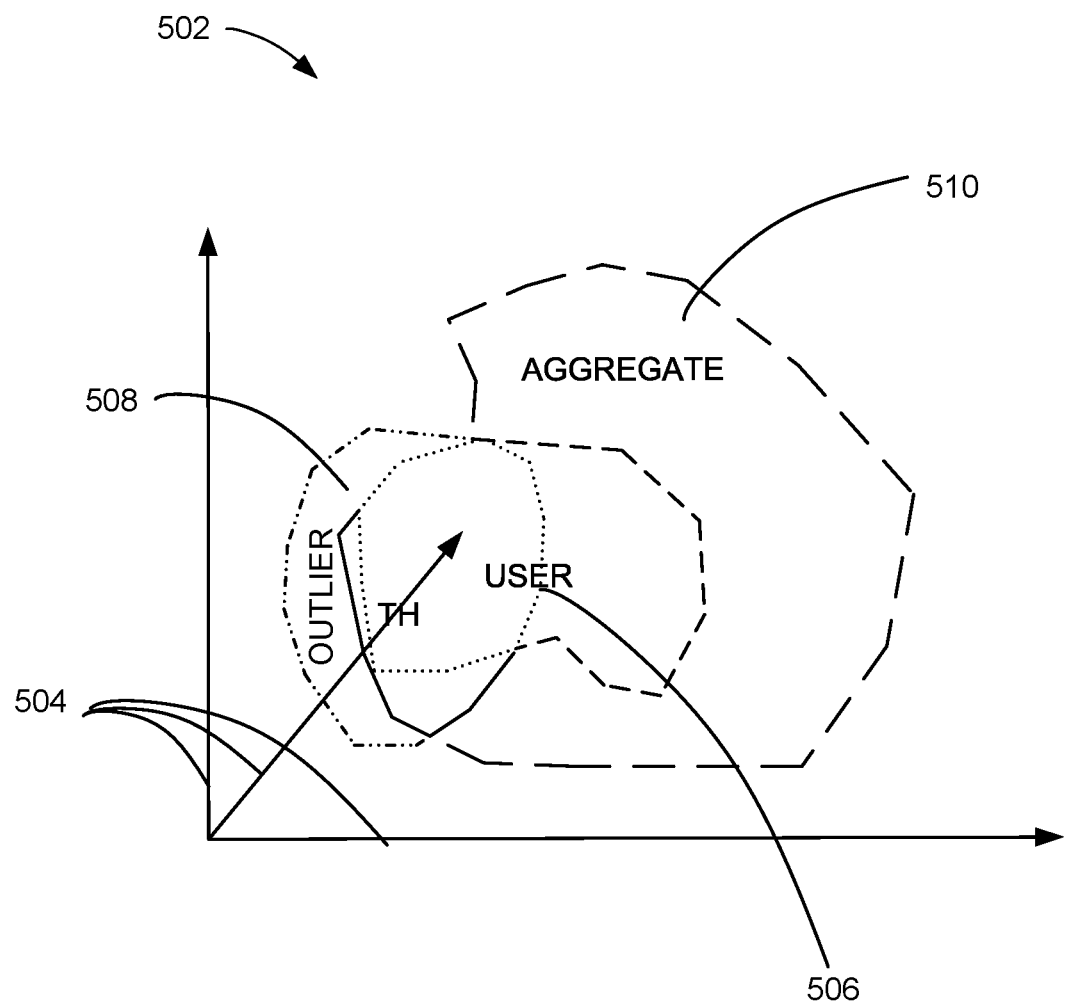
FIG. 5 is an example of a graphical depiction of an operation of a theft risk model by the compute system.

Referring now to FIG. 5, therein is shown an example of a graphical depiction of an operation of a theft risk model 502 by the compute system 100 of FIG. 1. The theft risk model 502 can include a representation for each of the authorized user 425, the vehicle 202, or a combination thereof as well as other type of factors 504 described later.

The example shown in FIG. 5 depicts the factors 504 utilized by the theft risk model 502. FIG. 5 depicts three axis, each represent one of the factors 504 or can be a combination of a selected types of the factors 504. FIG. 5 is shown for clarity and brevity depicting the three axes, although it is understood that the depiction can include more number of axes for the number of the factors 504 or can be represented differently.

The theft risk model 502 processes the factors 504 to determine what is consider a normal utilization 506 for the authorized user 425, the vehicle 202, or a combination thereof. The normal utilization 506 can be broken down and separate for the authorized user 425 and the vehicle 202 or can be combined, as described further in FIG. 6. For simplicity and brevity, the example shown if FIG. 5 as a volume labeled "USER", although it is understood that the labeling is for clarity and can also apply for the vehicle 202 and not only for the authorized user 425.

The example shown in FIG. 5 also depicts another volume to represent an outlier 508 to the normal utilization 506. The outlier 508 represents deviations for the vehicle 202, the authorized user 425, or a combination thereof.

The example shown in FIG. 5 also depicts another volume to represent an aggregation 510 to the utilization of the vehicle 202 or related to the vehicle 202. The aggregation 510 provides information relating to the factors 504 relating to more than one of the authorized user 425, operators who are not the authorized user 425, or a combination thereof for the theft risk model 502. The theft risk model 502 can determine or contribute to the determination for the outlier 508, the normal utilization 506, or a combination thereof based on the aggregation 510. In this example, the theft risk model 502 can analyze the factors 504 and can determine the outlier 508 is not enough of a deviation beyond the normal utilization 506 or to not notify the owner of the vehicle 202 of a theft.

The example shown in FIG. 5 also depicts a number of overlaps of at least two of the volumes of the normal utilization 506, the outlier 508, and the aggregation 510. Continuing this example, the theft risk model 502 can analyze the factors 504 and can determine the overlapped volumes of the normal utilization 506 and the aggregation 510 is not a deviation beyond the normal utilization 506 or not to notify the owner of the vehicle 202 of a theft, labeled in FIG. 5 with "TH". Also continuing this example, the theft risk model 502 can analyze the factors 504 and can determine the overlapped volumes of the outlier 508 and the aggregation 510 is not enough of a deviation beyond the normal utilization 506 or not to notify the owner of the vehicle 202 of a theft. Further continuing this example, the theft risk model 502 can analyze the factors 504 and can determine the overlapped volumes of the outlier 508, the aggregation 510, and the normal utilization 506 is enough of a deviation beyond the normal utilization 506 or to notify the owner of the vehicle 202 of a theft.

Figure 6:
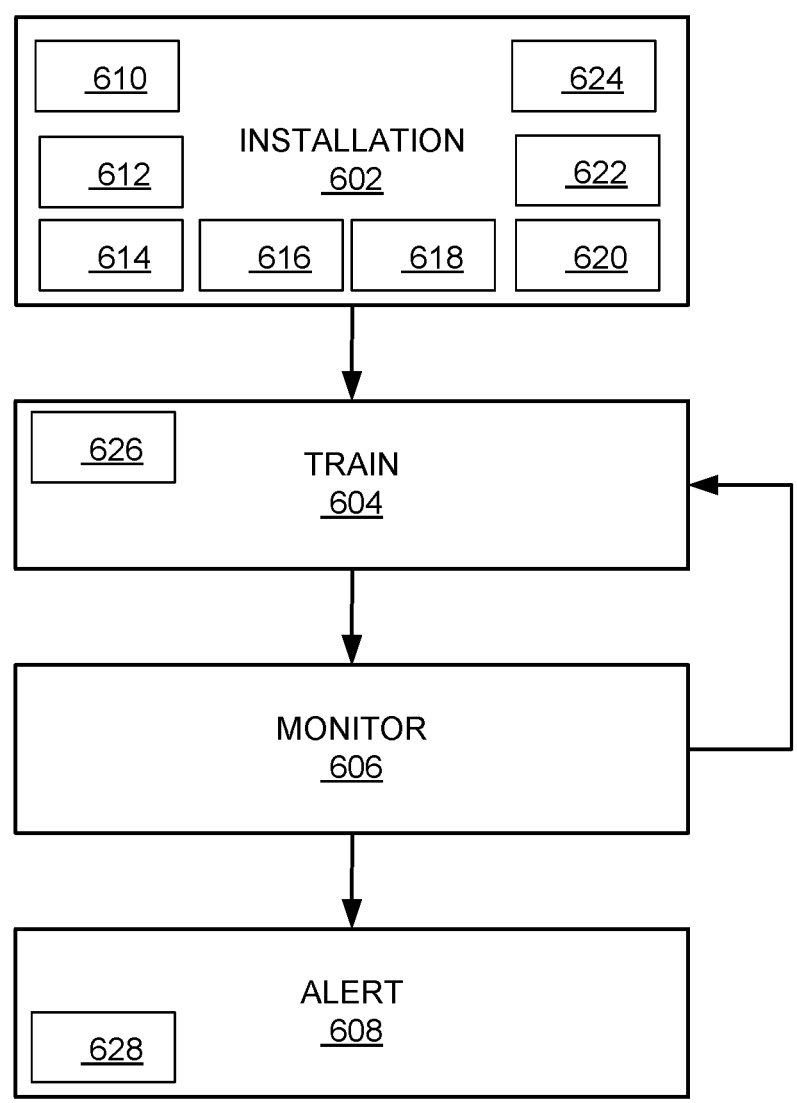
FIG. 6 is an example of a control flow of the compute system.

Referring now to FIG. 6, therein is shown a control flow of the compute system 100. The control flow in FIG. 6 depicts and describes an example of the theft alert mechanism by the compute system 100.

The compute system 100 can include the following modules: an installation module 602, a training module 604, a monitor module 606, an alert module 608, or a combination thereof. The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

In the example shown in FIG. 6, the installation module 602 can be coupled to the training module 604. The training module 604 can be coupled to the monitor module 606. The monitor module 606 can be coupled to the alert module 608.

The modules can be coupled using wired or wireless connections, by including an output of one module as an input of the other module, by including operations of one module influence operation of the other module, or a combination thereof. The modules can be directly coupled with no intervening structures or objects other than the connector there-between, or indirectly coupled. The modules can be coupled as function calls or procedural calls within the first software 326, the second software 342, or a combination thereof.

The installation module 602 ensure the various components of the compute system 100 is in place and connected for the operation of the theft alert mechanism. The installation module 602 receives a list of the authorized user 425 of FIG. 4, the vehicle 202 of FIG. 2, the authorized user 425 of FIG. 4 for the vehicle 202, or a combination thereof to be processed by the compute system 100.

As an example, a vehicle owner can identify additional authorized users by sharing account credentials or adding multiple accounts associated with a fleet of vehicles. The theft risk model 502 of FIG. 5 can include a representation for each of the authorized user 425, the vehicle 202, or a combination thereof.

The theft risk model 502 operates on an entry associated with the authorized user 425 of the vehicle 202, each instance of the vehicle 202, or a combination thereof. The theft risk model 502 determines or is part of making the determination of a probability 610 that an operator of the vehicle 202 is one of the authorized user 425 for the instance of the vehicle 202. The theft risk model 502 also determines or is part of making the determination of the probability 610 that an operator of the vehicle 202 is not one of the authorized user 425 for the instance of the vehicle 202.

As an example, the theft risk model 502 can be an artificial intelligence model. The artificial intelligence model can be implemented in a number of ways. For example, the artificial intelligence model be implemented with machine learning, deep learning, or a combination thereof. Examples of machine learning include supervised learning, unsupervised learning, semi-supervised learning, or a combination thereof. As a specific example, the machine learning can be a classifier to determine if the received input is within normal usage of the by the authorized user 425, the vehicle 202, or a combination thereof. Examples of deep learning can include long short-term memory (LSTM) learning, recurrent neural network (RNN), as well as other neural network architectures, or a combination thereof.

The probability 610 represents the likelihood that that operator is one of the authorized user 425 or not. The probability 610 can be calculated in based on the learning mechanism for the artificial intelligence model. For example, if the artificial intelligence model is implemented as a classifier then the probability 610 can be based on a threshold to output within normal or not normal usage. Also for example, if the artificial intelligence model is implemented as a neural network, then output can be based on the cost function for the neural network learning mechanism.

The theft risk model 502 determines the output based on the factors 504 of FIG. 5 for the artificial intelligence model. The factors 504 can include a user normal usage 612, a vehicle normal usage 614, a concurrent normal usage 616, or a combination thereof. The factors 504 can also include a priority event 618, a schedule 620, a caution 622, the aggregation 510, or a combination thereof.

The user normal usage 612 is a past pattern or instances for the authorized user 425. For example, the user normal usage 612 can be associated with the vehicle 202, the first device 102, or a combination thereof.

As specific examples, the user normal usage 612 can include a driver signature for the authorized user 425. For example, the driver signature can be determined by the vehicle-related sensor reading 211 of FIG. 2 for patterns typical from accelerometer from the vehicle 202, the first device 102, or a combination thereof. Also for example, the driver signature can also include the vehicle-related sensor reading 211 for braking, acceleration, and cornering with the vehicle 202 or associated with the pattern for the authorized user 425 of any instance of the vehicle 202.

The vehicle normal usage 614 is a past pattern or instances for the vehicle 202. For example, the vehicle normal usage 614 can relate to past routes, stops, timeframe, or a combination thereof associated with the vehicle 202.

As a specific examples, the vehicle normal usage 614 can determined by past patterns of the travel route 408 of FIG. 4, the starting location 432 of FIG. 4, the travel destination 410 of FIG. 4, the waypoint 450 of FIG. 4, or a combination thereof for the vehicle 202. Continuing the example, the vehicle normal usage 614 can also include the time clock 402 of FIG. 4 in association with the travel route 408 and portions of the travel route 408.

The concurrent normal usage 616 is the past pattern or instances where the user normal usage 612 and the vehicle normal usage 614 coincides. For example, the concurrent normal usage 616 can relate the nonvehicle reading 301 of FIG. 3 regarding the first device 102 associated with the authorized user 425 that concurrently coincides with the vehicle-related sensor reading 211 associated with the vehicle 202. As specific example, the authorized user 425 of the vehicle 202 can drive to work, which is a typical route and time to be within the vehicle normal usage 614. Continuing with this specific example, the first device 102 associated with the authorized user 425 can provide the nonvehicle reading 301 of FIG. 3 for geographic location that indicates a typical geographic location at a given time, which is the same as the route and time for the vehicle normal usage 614, to be the user normal usage 612. Also as a specific example, the first device 102 can connect to the communication or entertainment system in the vehicle 202 at times and days that are typical, such as weekday mornings while traveling to work. In such an example, the vehicle-related sensor reading 211 from the vehicle 202 and the first device 102 indicates both the user normal usage 612 and the vehicle normal usage 614 resulting in the concurrent normal usage 616.

Further for example, the interaction between the authorized user 425 and the vehicle 202 can also represent the user normal usage 612 and the vehicle normal usage 614 resulting in the concurrent normal usage 616. As a specific example, the vehicle-related sensor reading 211 can detect the interaction with the authorized user 425, such as voice command or voice patterns, from the volume sensor 220 of FIG. 2 to determine if such an interaction falls within the user normal usage 612, the vehicle normal usage 614, the concurrent normal usage 616, or a combination thereof. Also as a specific example, the vehicle-related sensor reading 211 can detect the interaction with the first device 10 associate with the authorized user 425 with the vehicle 202, such as a communication link for music, message, playlist, to determine if such an interaction falls within the user normal usage 612, the vehicle normal usage 614, the concurrent normal usage 616, or a combination thereof.

The priority event 618 indicates potentially impactful triggers or occurrence indicative of an unwanted disturbance or theft related to the vehicle 202. As an example, the priority event 618 can include the vehicle-related sensor reading 211 from the vehicle sensors 210 of FIG. 2 within the vehicle 202 for a glass breakage to a window of the vehicle 202. Also for example, the priority event 618 can include multiple triggers including the vehicle-related sensor reading 211 for a glass breakage following by an ignition start for the vehicle 202. The priority event 618 can be based on the vehicle-related sensor reading 211 for a single event or based on for concurrent or sequential multiple events. Further for example, the priority event 618 can include disconnection or unplugging of select devices within the vehicle 202. As a specific example, the select devices can include car alarm devices, the first location circuit 320 of FIG. 3, a device or dongle provide the on-board diagnostics 222 of FIG. 2, or a combination thereof.

The schedule 620 provides information about expected events, locations, routes, information, or a combination thereof related to the authorized user 425, the vehicle 202, or a combination thereof. The schedule 620 can be associated based on time or activities that are upcoming in the future, past, or a combination thereof.

For example, the schedule 620 can be based on a calendar for the authorized user 425. Also for example, the schedule 620 can be based on a rental schedule or a fleet schedule for the vehicle 202. Further for example, the schedule 620 can include information overlapping occurrence for the authorized user 425 and the vehicle 202. The overlapping occurrence can be the same type of information, such as time and location of pickup of a rental car, or can be related information, such as the vehicle 202 takes the travel route 408 passing or stopping at the waypoint 450 that is noted as a meeting location on the calendar for the authorized user 425.

The caution 622 provides information related to known or potential risk to the authorized user 425, the vehicle 202, or a combination thereof. As an example, the travel route 408 that shows the vehicle 202 near a high crime rate for car theft or auto shops for stolen cars and not within the user normal usage 612, the vehicle normal usage 614, the concurrent normal usage 616, the schedule 620, or a combination thereof, then the probability 610 is much higher that the driver of the vehicle 202 is not the authorized user 425. The operation of the artificial intelligence model can generate information for the caution 622 based on the probability 610 and the factors 504 contributing the generation of the probability 610.

The aggregation 510 provides information relating to the factors 504 relating to more than one of the authorized user 425, operators who are not the authorized user 425, or a combination thereof for the artificial intelligence model to determine the probability 610. The aggregation 510 can provide information that would be the factors 504 but not limited to those that are the authorized user 425. For example, the aggregation 510 can provide the travel route 408 driven to go to the waypoint 450, such as a mall or airport, even if choices for the travel route 408 are not within the user normal usage 612, the vehicle normal usage 614, the concurrent normal usage 616, or a combination thereof. As a specific example, the aggregation 510 can include cross user big data patterns of reasonable routes as the travel route 408 to take, such as going to the airport or the mall. The artificial intelligence model can remove situations where the authorized user 425, the vehicle 202, or a combination thereof travels to the waypoint 450 that is a normal location but the travel to the waypoint 450 is the first time over a holiday. The artificial intelligence model can utilize the aggregation 510 concurrently with the other types of the factors 504 or sequentially or intermixed.

The theft risk model 502 can utilize the factors 504 simultaneously, sequentially, weighted equally or non-equally, or a combination thereof in a static configuration or in a changing or dynamic configuration. The artificial intelligence model can utilize the factors 504 as features or inputs and the factors 504 utilization can be based on the learning mechanism utilized. For example, the weighting for the factors 504 can be non-equally weighted depending on the training and can depend on each of the authorized user 425. The factors 504 can also be dynamically changing or adjusting if the artificial intelligence model utilizes some form of reinforcement learning to improve the accuracy of the probability 610 output as new inputs are available.

For example, the theft risk model 502 can utilize the priority event 618 only to determine the probability 610 whether or not the operation of the vehicle 202 is by the authorized user 425. Also for example, the theft risk model 502 can utilize the priority event 618 in conjunction with the user normal usage 612, the vehicle normal usage 614, the concurrent normal usage 616, the schedule 620, the caution 622, or a combination thereof to determine the probability 610. Further for example, the theft risk model 502 can utilize the user normal usage 612, the vehicle normal usage 614, the concurrent normal usage 616, or a combination thereof without the priority event 618 to determine the probability 610.

Returning to the overall description of the installation module 602, the compute system 100 can also ensure the vehicle sensors 210 for the vehicle 202 are connection access to the communication path 104 of FIG. 1. The compute system 100 enable a real-time 624 communication of the vehicle-related sensor reading 211 from the vehicle sensors 210 embedded in the vehicle 202 and processing by the theft risk model 502.

The real-time 624 communication refers to the transmission of the vehicle-related sensor reading 211 as generated by the vehicle sensors 210 with the purpose to store as needed for transmission for processing by the theft risk model 502. The real-time 624 communication refers to transmission of the vehicle-related sensor reading 211 as generated by the vehicle sensors 210 without the purpose to store and hold for later transmission for later processing.

The real-time 624 processing by the artificial intelligence model of the theft risk model 502 inputs the vehicle-related sensor reading 211 from the vehicle sensors 210 and processes the input as received. The inputs are not stored to start processing at a later time by the artificial intelligence model.

As an example, the artificial intelligence model of the theft risk model 502 utilizes the vehicle-related sensor reading 211 sent in the real-time 624 from the vehicle sensors 210 as inputs simultaneously, sequentially, or intermixed. Continuing with this example, the theft risk model 502 monitors the vehicle-related sensor reading 211 received in the real-time 624 from the vehicle 202 or from the vehicle sensors 210 built into the vehicle 202. As specific examples, the vehicle sensors 210 can provide as the vehicle-related sensor reading 211 the accelerometer data, ignition status as on or off, GPS location data, disturbance of the vehicle 202 in a short period, glass break detection, removal of the dongle for the on-board diagnostics 222 of FIG. 2, and driver behavior data.

The flow can progress from the installation module 602 to the training module 604.

The training module 604 performs the training of the theft risk model 502 including the artificial intelligence model based on the factors 504 as part of the features.

The features for training the artificial intelligence model can be based on the user normal usage 612, the vehicle normal usage 614, the concurrent normal usage 616, the priority event 618, the schedule 620, the caution 622, or a combination thereof. A non-priority event 623 represent the level of urgency based on the vehicle-related sensor reading 211 not rising to the level of the priority event 618. For example the non-priority event 623 can be based on a deviation from the user normal usage 612, the vehicle normal usage 614, the concurrent normal usage 616, the priority event 618, the schedule 620, or a combination thereof. The caution 622 can be included in the non-priority event 623 or the priority event 618 depending on the other types of the factors 504.

The features for training can also be based on specific instance of the vehicle 202, the authorized user 425, or a combination thereof. The features can also include a combination of the examples as described earlier.

The features for training can also be based on the non-priority event 623, the priority event 618, or a combination thereof. For examples, the features can be based on not being within the user normal usage 612, the vehicle normal usage 614, the concurrent normal usage 616, the schedule 620, or a combination thereof. Also for example, the features can be based on the caution 622. Continuing with this example, the features for training can also be based on specific instance of the vehicle 202, the authorized user 425, or a combination thereof. The features can also include a combination of the examples as described earlier.

As an example, the theft risk model 502 can be trained with various sequences of the factors 504, including events, to learn to recognize the outlier 508, a theft level indicator 626, or a combination thereof in the series of the factors 504 as the features.

The outlier 508 represents deviations for the vehicle 202, the authorized user 425, or a combination thereof. As examples, the outlier 508 can be based on the non-priority event 623, the priority event 618, or a combination thereof.

The theft level indicator 626 represents an indication of the vehicle 202 being stolen or has been stolen. For example, the theft level indicator 626 can be based on the outlier 508, the non-priority event 623, the priority event 618, or a combination thereof.

Depending on the probability 610 indicating an instance of the outlier 508, the compute system 100 can determine the theft level indicator 626 based on the outlier 508. For example, the outlier 508, the theft level indicator 626, or a combination thereof can trigger a signal an operator of the vehicle 202 as possible new user or a user that is not one of the authorized user 425 through to a theft alert 628, such as a stolen vehicle warning.

If the theft risk model 502 determines the probability 610 as the outlier 508, such as a trained or learned threshold, or the theft level indicator 626, the compute system 100 can notify the owner of the vehicle 202 with the theft alert 628. The theft alert 628, such as a mobile app notification, a text message, a phone call, can sent and displayed on the first device 102. Optionally, the compute system 100 can send the theft alert 628 to others, such as a security or police services.

The training module 604 can train the theft risk model 502 for each of the authorized user 425 in a number of ways. For example, the compute system 100 can store the patterns for the authorized user 425, for the vehicle 202, or a combination thereof. Continuing this example, the compute system 100 can record the time, the waypoint 450, the travel route 408, and other items for the authorized user 425. The theft risk model 502 can also record adherence to or deviations to the schedule 620 for the authorized user 425. The theft risk model 502 can store proximity, if any, to geographic locations or activities associated with the caution 622. The theft risk model 502 can be stored as an anonymized model of likely usage by the authorized user 425.

As a specific example, the compute system 100 can operate the theft risk model 502 for a new user as one the authorized user 425. The training module 604 can undergo a training or learning period, T, for the theft risk model 502. Continuing the example, the new member as the authorized user 425 undergo the installation process, such as with the installation module 602. The compute system 100 monitors the authorized user 425 operates or interacts with the instances or types of the vehicle 202 and how. The compute system 100, the training module 604, or a combination thereof can develop a profile for the authorized user 425, both for new as well as for existing. The profile can include information for the factors 504, such as time, location, routes, driving styles or driver signature.

Continuing with the specific example for a new or existing person as the authorized user 425, the compute system 100 can record or monitor the authorized user 425 in a number of ways. As an example, the compute system 100 can perform the monitor and record function with the vehicle sensors 210 in the vehicle 202, the first device 102 as a smart phone with the authorized user 425, or a combination thereof. The monitoring, recording, and developing the profiles is used to help build the theft risk model 502. Optionally, the theft risk model 502 can be collect and anonymize the monitored and recorded information for the factors 504. The theft risk model 502 can represent a model for the authorized user 425 as an individual or for a collection of individuals.

The flow can progress from the training module 604 to the monitor module 606.

The compute system 100 operate without the need to turn on or activate the theft alert mechanism. As long as communication between the vehicle 202 and the compute system 100 is available, the theft alert mechanism is operating and the theft risk model 502 is operating. As the compute system 100 operates, the monitor module 606 determines if the operator of one of the vehicle 202 monitored by the theft risk model 502 is one person to be the authorized user 425 to determine if the owner of the vehicle or others need to be notified.

The monitor module 606 can determine the operator in a number of ways. For example, the monitor module 606 can operation the theft risk model 502 as well as monitor the priority event 618 in the real-time 624. As an example, the priority event 618 alone can cause the monitor module 606, the theft risk model 502, or a combination thereof issue the theft alert 628 to the owner of the vehicle with the alert module 608. Also as an example, the monitor module 606, the theft risk model 502, or a combination thereof can utilize the priority event 618 along with other type of the factors 504 to determine whether the theft alert 628 should be sent. As described earlier, the theft alert 628 can be generated with the priority event 618 analyzed concurrently with the other type of the factors 504, sequentially, intermixed, or a combination thereof.

The monitor module 606 can utilized the factors 504 from the vehicle-related sensor reading 211 of the vehicle sensors 210 embedded within the vehicle 202, the first device 102 associated with the authorized user 425, or a combination thereof. The authorized user 425 can be the driver of the vehicle 202 or a passenger of the vehicle 202 and monitors by the first device 102.

As the vehicle 202 start moving, the operation module, the theft risk model 502, or a combination thereof can operate as embedded as part of the vehicle 202, the first device 102, or a combination thereof to monitor and record data.

The theft risk model 502 receives the real-time 624 reading from the vehicle 202, the first device 102, or a combination thereof to determine the probability 610 that the operator of the vehicle 202 determined to be the authorized user 425 or a passenger in the vehicle 202 is the authorized user 425. The theft risk model 502 determines the probability 610 for the operation of the vehicle 202 as within the factors 504 such as the user normal usage 612, the vehicle normal usage 614, the concurrent normal usage 616, or combination thereof. The theft risk model 502 can also determine the probability 610 as being with the schedule 620 for the vehicle 202, the authorized user 425, or a combination thereof. The theft risk model 502 can further determine the probability 610 including the caution 622.

The theft risk model 502 performs the real-time 624 processing of the vehicle-related sensor reading 211, the nonvehicle reading 301, or a combination thereof received in the real-time 624 relating to the factors 504. The theft risk model 502 can detect the outlier 508, the theft level indicator 626, or a combination thereof in the real-time 624.

As an example, the outlier 508 or the theft level indicator 626 can be based on the priority event 618, such as a glass break of the vehicle 202. The outlier 508 of this type can represent the priority event 618 for the theft level indicator 626 and the theft alert 628 can be generated and issued with the alert module 608. If the outlier 508 is not determined to be one as the priority event 618, the theft risk model 502 still monitors the other types of the factors 504 as the non-priority event 623 to calculate the probability 610 and to detect the outlier 508.

Also as an example, the theft risk model 502 can detect a change in the behavior or pattern for the authorized user 425, the vehicle 202, or a combination thereof. As a specific example, the theft risk model 502 can determine that the probability 610 is within the user normal usage 612, the vehicle normal usage 614, the concurrent normal usage 616, within the schedule 620, or a combination thereof for a portion of the travel route 408.

As a further example, as the theft risk model 502 continues to monitor the vehicle 202 along the travel route 408 or over time, the vehicle 202 can change course to the point of the probability 610 determined to be the outlier 508 but not necessarily as the theft level indicator 626. Continuing the example, the theft risk model 502 can determine a situation of a car theft after the vehicle-related sensor reading 211 includes the priority event 618 of glass breakage followed by a deviation from the travel route 408 outside the user normal usage 612, the vehicle normal usage 614, not within the schedule 620 or a combination thereof. The change and detection for the outlier 508 can be determined to be the theft level indicator 626 and can trigger the theft alert 628 with the alert module 608.

Further for example, as the theft risk model 502 monitors the vehicle 202, the authorized user 425, or a combination thereof and does not receive the priority event 618 but lesser deviations for the other types of the factors 504, the outlier 508 can be detected but the probability 610 can be a value such that the outlier 508 is not large deviation and would not necessarily be determined to be the theft level indicator 626. In other words, the outlier 508 is not too far off or for too long from the vehicle normal usage 614, the user normal usage 612, the schedule 620, or a combination thereof. Throughout the operation of the theft risk model 502, there can be a number of different instances of the outlier 508 or multiple detection of the same type of the outlier 508 for different days and the probability 610 is below a threshold such that the monitor module 606 does not determine the outlier 508 to be the theft level indicator 626 and does not generate the theft alert 628.

Yet further for example, the monitor module 606 can generate the theft alert 628 without the theft risk model 502 detecting the outlier 508. Continuing the example, some of the factors 504 that are not considered with the priority event 618 can quickly elevated to the priority event 618 even if still with the user normal usage 612, the vehicle normal usage 614, the concurrent normal usage 616, the schedule 620, or a combination thereof.

As a specific example, the theft risk model 502 can monitor the authorized user 425 within the vehicle normal usage 614, the concurrent normal usage 616, the schedule 620, or a combination thereof but suddenly starts traveling at dangerously high speeds. The theft risk model 502 processes the vehicle-related sensor reading 211, the nonvehicle reading 301, or a combination thereof for the sudden increase in the speed and elevates to the level of the priority event 618 for the monitor module 606 to determine the theft level indicator 626 and to generate the theft alert 628 with the alert module 608. This is an example of the overlap labeled as "TH" in FIG. 5.

Also as a specific example, the theft risk model 502 has learned and been trained that one person as the authorized user 425 rarely driver the vehicle 202 after midnight. Continuing this example, the theft risk model 502 one day monitors the vehicle 202 to receive the vehicle-related sensor reading 211 from the vehicle sensors 210 in the vehicle 202 indicating a bump at 2:14 am, followed by an ignition on, and the driver behavior does not match the driver signature of the authorized user 425 or another other person as the authorized user 425 for the vehicle 202. In this example, the theft risk model 502 can determine the probability 610 such that there is a high likelihood that the car is being stolen.

The monitor module 606 can also return or loop back to the training module 604 for reinforcement learning to improve the accuracy of the theft risk model 502. The reinforcement learning can be utilized to improve the accuracy for new users, as seasonal changes can change the normal utilization 506, as the aggregation 510 can also change, the handling of the priority event 618 or the non-priority event 623, or a combination thereof.

The alert module 608 provides the notification for the theft alert 628. As an example, the notification can be to the owner of the vehicle 202, law enforcement, security service, any number of the authorized user 425, or a combination thereof.

It has been discovered that the compute system 100 improves the accuracy and performance without the need for active turn-on or activation after installation for providing the theft alert 628 by receiving the vehicle-related sensor reading 211, nonvehicle reading 301, or a combination thereof in the real-time 624 for the priority event 618, the non-priority event 623, or a combination thereof. An additional the effectiveness and the usefulness for action to be taken is provided by the compute system 100 by processing the vehicle-related sensor reading 211, nonvehicle reading 301, or a combination thereof in the real-time 624 to generate the theft alert 628 to be actionable, such as stop the operation of the vehicle 202, sound alarm at the vehicle 202, even auto-drive the vehicle 202 to a safe stop, or a combination thereof.

It has also been discovered that the compute system 100 improves the accuracy and performance without the need for active turn-on or activation after installation for providing the theft alert 628 based on the normal utilization 506 including the user normal usage 612, the vehicle normal usage 614, the concurrent normal usage 616, or a combination thereof. The compute system 100 improves accuracy by utilization the schedule 620 and the aggregation 510 of other drivers to help filter to false trigger of the theft alert 628.

It has further been discovered that the compute system 100 improves the accuracy and performance without the need for active turn-on or activation after installation for providing the theft alert 628 based on the elevation of the non-priority event 623 to the priority event 618 based on sudden deviation. The elevation provides an improved response time to generate the theft alert 628.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The modules can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The compute system 100 has been described with module functions or order as an example. The compute system 100 can partition the modules differently or order the modules differently. For example, the loops can be different or be eliminated. Also for example, the training module 604 can be eliminated with the use of the aggregation 510, unsupervised learning, transfer learning from other drivers in the area or the class of the vehicle 202, or a combination thereof.

For illustrative purposes, the various modules have been described as being specific to the first device 102, the second device 106, the vehicle 202, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the vehicle 202. Examples of the non-transitory computer readable medium can be a non-volatile memory card or stick, an external hard disk drive, a tape cassette, or an optical disk.

The physical transformation of the function of the theft risk model 502 to generate the theft alert 628 based on the normal utilization 506, the vehicle-related sensor reading 211, the nonvehicle reading 301, the priority event 618, the non-priority event 623, the schedule 620, the caution 622, the outlier 508, the aggregation 510, the theft level indicator 626, or a combination thereof leads action in the real world. Examples of real world actions or impacts include stop the operation of the vehicle 202, sound alarm at the vehicle 202, even auto-drive the vehicle 202 to a safe stop, or a combination thereof. In turn, the real world interactions with the compute system 100 provides a more improved accuracy with the normal utilization 506, the outlier 508, the aggregation 510, or a combination thereof with or without reinforcement learning.

Figure 7:
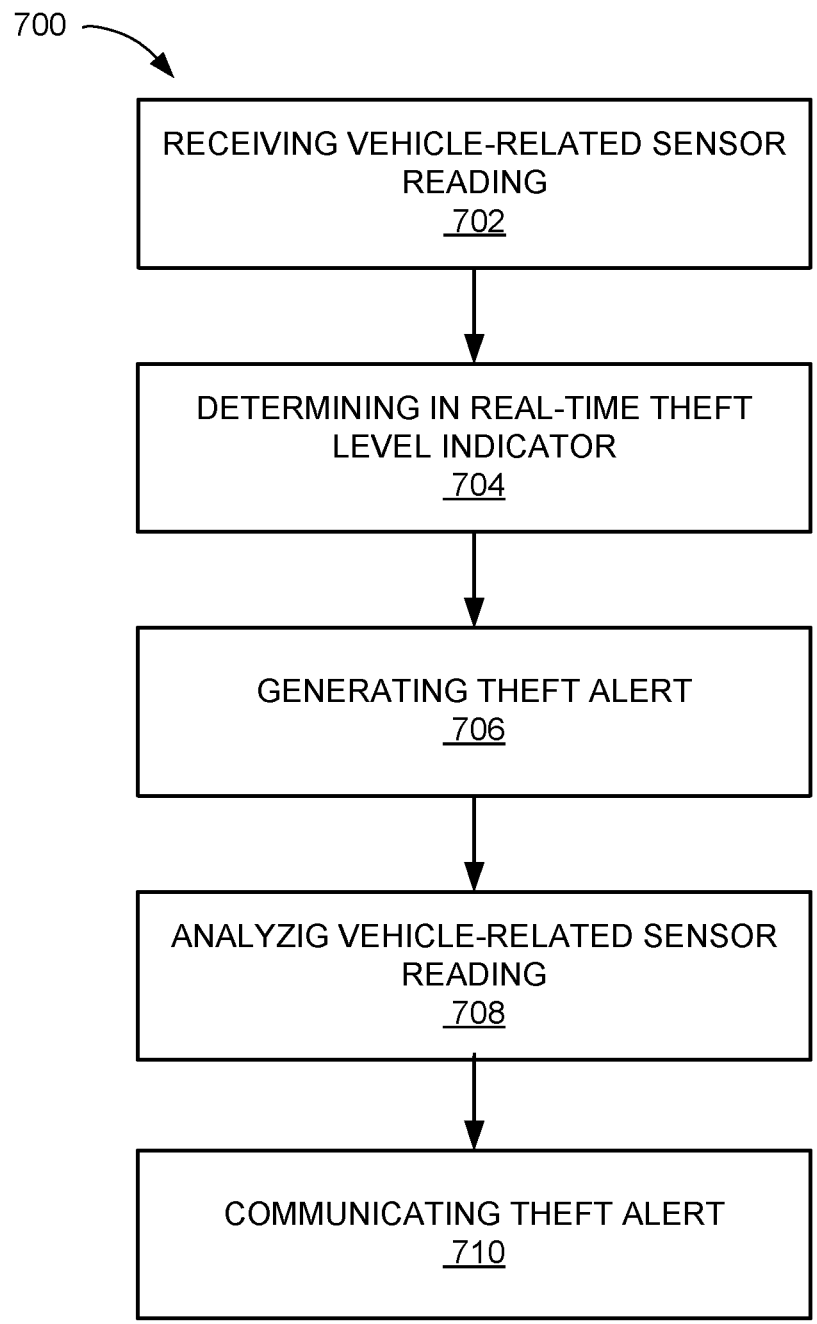
FIG. 7 is a flow chart of a method of operation of a compute system in an embodiment of the present invention.

Referring now to FIG. 7, therein is shown a flow chart of a method 700 of operation of a compute system 100 in an embodiment of the present invention. The method 700 includes: receiving a vehicle-related sensor reading in a real-time in a box 702; determining in the real-time a theft level indicator for a vehicle based on the vehicle-related sensor reading in a box 704; generating a theft alert based on the theft level indicator being a priority event in a box 706; analyzing the vehicle-related sensor reading with a theft risk model to generate the theft alert when the theft level indicator is a non-priority event in a box 708; and communicating the theft alert for displaying on a device in a box 710.

As an example, the method 700 further includes receiving a nonvehicle reading in the real-time; and wherein determining in the real-time the theft level indicator includes determining the theft level indicator based on the nonvehicle reading. Further as an example, the method 700 includes wherein determining in the real-time the theft level indicator includes determining the theft level indicator based on a deviation a user normal usage, a vehicle normal usage, a concurrent normal usage, a schedule or a combination thereof.

Also as an example, the method 700 includes receiving a nonvehicle reading in the real-time; wherein analyzing the vehicle-related sensor reading with the theft risk model includes: analyzing the nonvehicle reading; determining an outlier based on a deviation a user normal usage, a vehicle normal usage, a concurrent normal usage, a schedule or a combination thereof; and generating the theft level indicator based on the outlier.

Yet further as an example, the method 700 includes analyzing the vehicle-related sensor reading with the theft risk model includes: detecting a sudden deviation in a vehicle normal usage based on the vehicle-related sensor reading without determining an outlier for the vehicle normal usage; and generating the theft alert without the determination of the outlier.

Still further as an example, the method 700 includes analyzing the vehicle-related sensor reading with the theft risk model includes detecting a deviation in a vehicle normal usage based on the vehicle-related sensor reading but within a schedule without determining an outlier for the vehicle normal usage.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:
    receiving a vehicle-related sensor reading, a nonvehicle reading, or a combination thereof in a real-time;
    determining in the real-time a theft level indicator for a vehicle based on the vehicle-related sensor reading, the nonvehicle reading, or a combination thereof;
    generating a theft alert if the theft level indicator being a priority event without analyzing the vehicle-related sensor reading with a theft risk model;
    analyzing the vehicle-related sensor reading, the nonvehicle reading, or a combination thereof with the theft risk model including:
        determining an outlier based on a deviation a user normal usage, a vehicle normal usage, a concurrent normal usage, a schedule or a combination thereof,
        generating the theft level indicator based on the outlier;
    generating the theft alert if the theft level indicator is a non-priority event and the analyzing the vehicle-related sensor reading, the nonvehicle reading, or a combination thereof; and
    communicating the theft alert for displaying on a device.

2. The method as claimed in claim 1 wherein determining in the real-time the theft level indicator includes determining the theft level indicator based on the deviation the user normal usage, the vehicle normal usage, the concurrent normal usage, the schedule, or a combination thereof.

3. The method as claimed in claim 1 wherein analyzing the vehicle-related sensor reading with the theft risk model includes:
    detecting a sudden deviation in the vehicle normal usage based on the vehicle-related sensor reading without determining the outlier for the vehicle normal usage; and
    generating the theft alert without the determination of the outlier.

4. The method as claimed in claim 1 wherein determining in the real-time the theft level indicator includes:
    detecting a sudden deviation for the non-priority event based on the vehicle normal usage; and
    elevating the non-priority event to the priority event determining the outlier for the vehicle normal usage.

5. The method as claimed in claim 1 wherein analyzing the vehicle-related sensor reading with the theft risk model includes detecting the deviation in the vehicle normal usage based on the vehicle-related sensor reading but within the schedule without determining the outlier for the vehicle normal usage.

6. A compute system comprising:
    a control circuit configured to:
    determine in a real-time a theft level indicator for a vehicle based on a vehicle-related sensor reading, a nonvehicle reading, or a combination thereof;
    generate a theft alert if the theft level indicator being a priority event without analyzing the vehicle-related sensor reading with a theft risk model;
    analyze the vehicle-related sensor reading, the nonvehicle reading, or a combination thereof with the theft risk model including:
        determine an outlier based on a deviation a user normal usage, a vehicle normal usage, a concurrent normal usage, a schedule or a combination thereof,
        generate the theft level indicator based on the outlier;
    generate the theft alert if the theft level indicator is a non-priority event and the analysis the vehicle-related sensor reading, the nonvehicle reading, or a combination thereof; and
    a communication circuit, coupled to the control circuit, configured to:
    receive the vehicle-related sensor reading the nonvehicle reading, or a combination thereof in the real-time; and
    communicate the theft alert for displaying on a device.

7. The system as claimed in claim 6 wherein the control circuit is further configured to determine in the real-time the theft level indicator including to determine the theft level indicator based on the deviation the user normal usage, the vehicle normal usage, the concurrent normal usage, the schedule, or a combination thereof.

8. The system as claimed in claim 6 wherein the control circuit is further configured to analyze the vehicle-related sensor reading with the theft risk model including to:

detect a sudden deviation in the vehicle normal usage based on the vehicle-related sensor reading without determining the outlier for the vehicle normal usage; and generate the theft alert without the determination of the outlier.

9. The system as claimed in claim 6 wherein the control circuit is further configured to determine in the real-time the theft level indicator including to:

detect a sudden deviation for the non-priority event based on the vehicle normal usage; and elevate the non-priority event to the priority event determining the outlier for the vehicle normal usage.

10. The system as claimed in claim 6 wherein the control circuit is further configured to analyze the vehicle-related sensor reading with the theft risk model including to detect the deviation in the vehicle normal usage based on the vehicle-related sensor reading but within the schedule without determining the outlier for the vehicle normal usage.

11. A non-transitory computer readable medium including instructions executable by a control circuit for a compute system comprising:

receiving a vehicle-related sensor reading, a nonvehicle reading, or a combination thereof in a real-time;

determining in the real-time a theft level indicator for a vehicle based on the vehicle-related sensor reading, the nonvehicle reading, or a combination thereof;

generating a theft alert if the theft level indicator being a priority event without analyzing the vehicle-related sensor reading with a theft risk model;

analyzing the vehicle-related sensor reading, the nonvehicle reading, or a combination thereof with the theft risk model including:

determining an outlier based on a deviation a user normal usage, a vehicle normal usage, a concurrent normal usage, a schedule or a combination thereof, generating the theft level indicator based on the outlier;

generating the theft alert if the theft level indicator is a non-priority event and the analyzing the vehicle-related sensor reading, the nonvehicle reading, or a combination thereof; and communicating the theft alert for displaying on a device.

12. The non-transitory computer readable medium as claimed in claim 11 wherein determining in the real-time the theft level indicator includes determining the theft level indicator based on the deviation the user normal usage, the vehicle normal usage, the concurrent normal usage, the schedule, or a combination thereof.

13. The non-transitory computer readable medium as claimed in claim 11 wherein analyzing the vehicle-related sensor reading with the theft risk model includes:

detecting a sudden deviation in the vehicle normal usage based on the vehicle-related sensor reading without determining the outlier for the vehicle normal usage; and generating the theft alert without the determination of the outlier.

14. The non-transitory computer readable medium as claimed in claim 11 wherein determining in the real-time the theft level indicator includes:

detecting a sudden deviation for the non-priority event based on the vehicle normal usage; and elevating the non-priority event to the priority event determining the outlier for the vehicle normal usage.

* * * * *